United States Patent
Jungkunz et al.

(10) Patent No.: US 12,081,139 B2
(45) Date of Patent: Sep. 3, 2024

(54) POWER CONVERTER REDUCING AN ERROR VOLTAGE GENERATED BY SWITCHING ELECTRONIC SWITCHING ELEMENTS

(71) Applicant: Siemens Energy Global GmbH & Co. KG, Munich (DE)

(72) Inventors: Clemens Jungkunz, Erlangen (DE); Ulrich Zahner, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 206 days.

(21) Appl. No.: 17/633,272

(22) PCT Filed: Aug. 5, 2019

(86) PCT No.: PCT/EP2019/070986
§ 371 (c)(1),
(2) Date: Feb. 7, 2022

(87) PCT Pub. No.: WO2021/023365
PCT Pub. Date: Feb. 11, 2021

(65) Prior Publication Data
US 2022/0360193 A1 Nov. 10, 2022

(51) Int. Cl.
*H02M 7/483* (2007.01)
(52) U.S. Cl.
CPC ......... *H02M 7/483* (2013.01); *H02M 7/4835* (2021.05)
(58) Field of Classification Search
CPC .......................... H02M 7/483; H02M 7/4835
See application file for complete search history.

(56) References Cited

U.S. PATENT DOCUMENTS

| 6,005,788 A | 12/1999 | Lipo et al. |
| 6,556,461 B1 | 4/2003 | Khersonsky et al. |
| 2013/0128636 A1* | 5/2013 | Trainer ............... H02J 7/02 363/65 |

(Continued)

FOREIGN PATENT DOCUMENTS

DE  102009043598 A1  4/2011

OTHER PUBLICATIONS

Rohner et al., "Modulation, Losses, and Semiconductor Requirements of Modular Multilevel Converters", IEEE, vol. 57, No. 8, p. 2633-2642 (Year: 2010).*

(Continued)

*Primary Examiner* — Jue Zhang
*Assistant Examiner* — Lakaisha Jackson
(74) *Attorney, Agent, or Firm* — Laurence A. Greenberg; Werner H. Stemer; Ralph E. Locher

(57) ABSTRACT

A power converter contains at least one phase module which has a plurality of modules which are electrically connected in series. Each module has a first electrical module connection, a second electrical module connection, a first electronic switching element, a second electronic switching element and an electrical energy storage device. The phase module is assigned at least one controllable voltage source which is suitable for generating a compensation voltage in response to a corresponding actuation, the compensation voltage has a time profile such that it reduces an error voltage generated by the switching of the first electronic switching elements and the second electronic switching elements of the module.

21 Claims, 5 Drawing Sheets

(56) References Cited

U.S. PATENT DOCUMENTS

2020/0067421 A1* 2/2020 Mangold ............... H02M 7/003
2020/0177096 A1* 6/2020 Ginnareddy ........ H02M 7/4835

OTHER PUBLICATIONS

Ruderman A et al: "A hybrid asymmetric cascaded multilevel inverter comprising high resolution and symmetric low resolution parts"; Electrical and Electronics Engineers in Israel; 2008. IEEE! 2008. IEEE 25th Convention Of; IEEE; Piscataway; NJ; USA; Dec. 3, 2008; pp. 21-25; XP031399426; ISBN: 978-1-4244-2481-8.
Rodriguez J et al: "Multilevel Voltage-Source-Converter Topologies for Industrial Medium-Voltage Drives"; IEEE Transactions on Industrial Electronics, IEEE Service Center; Piscataway; NJ; USA; Bd. 54; Nr. 6; Dec. 1, 2007; pp. 2930-2945; XP011194602; ISSN: 0278-0046, DOI: 10.1109/TIE.2007.907044.
Steffen Rohner et al: "Modulation, Losses and Semiconductor Requirements of Modular Multilevel Converters"; IEEE Transactions on Industrial Electronics; IEEE Service Center; Piscataway; NJ; USA; Bd. 54; Nr. 8; Aug. 1, 2010; pp. 2633-2642; XP011295533; ISSN: 0278-0046.

* cited by examiner

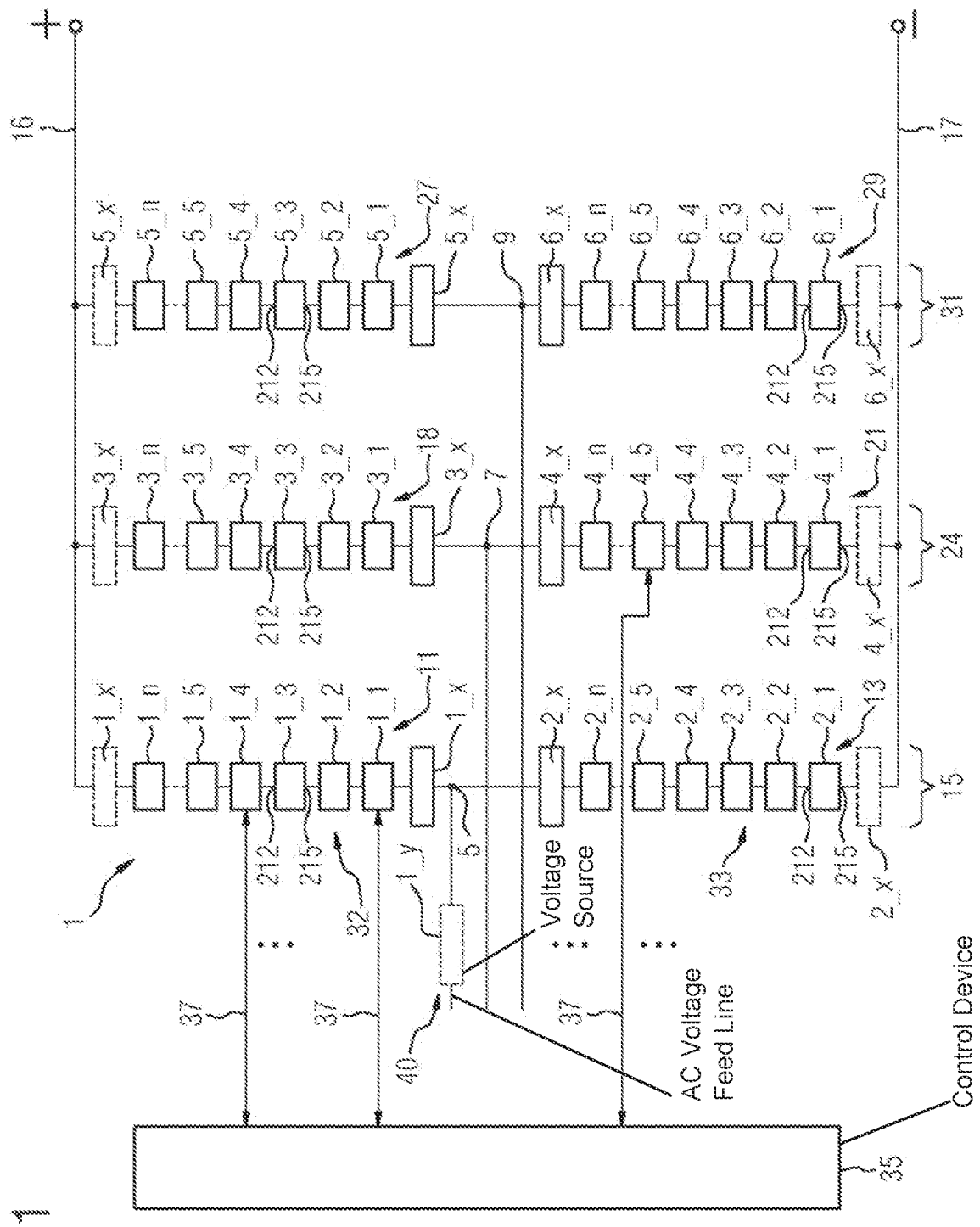

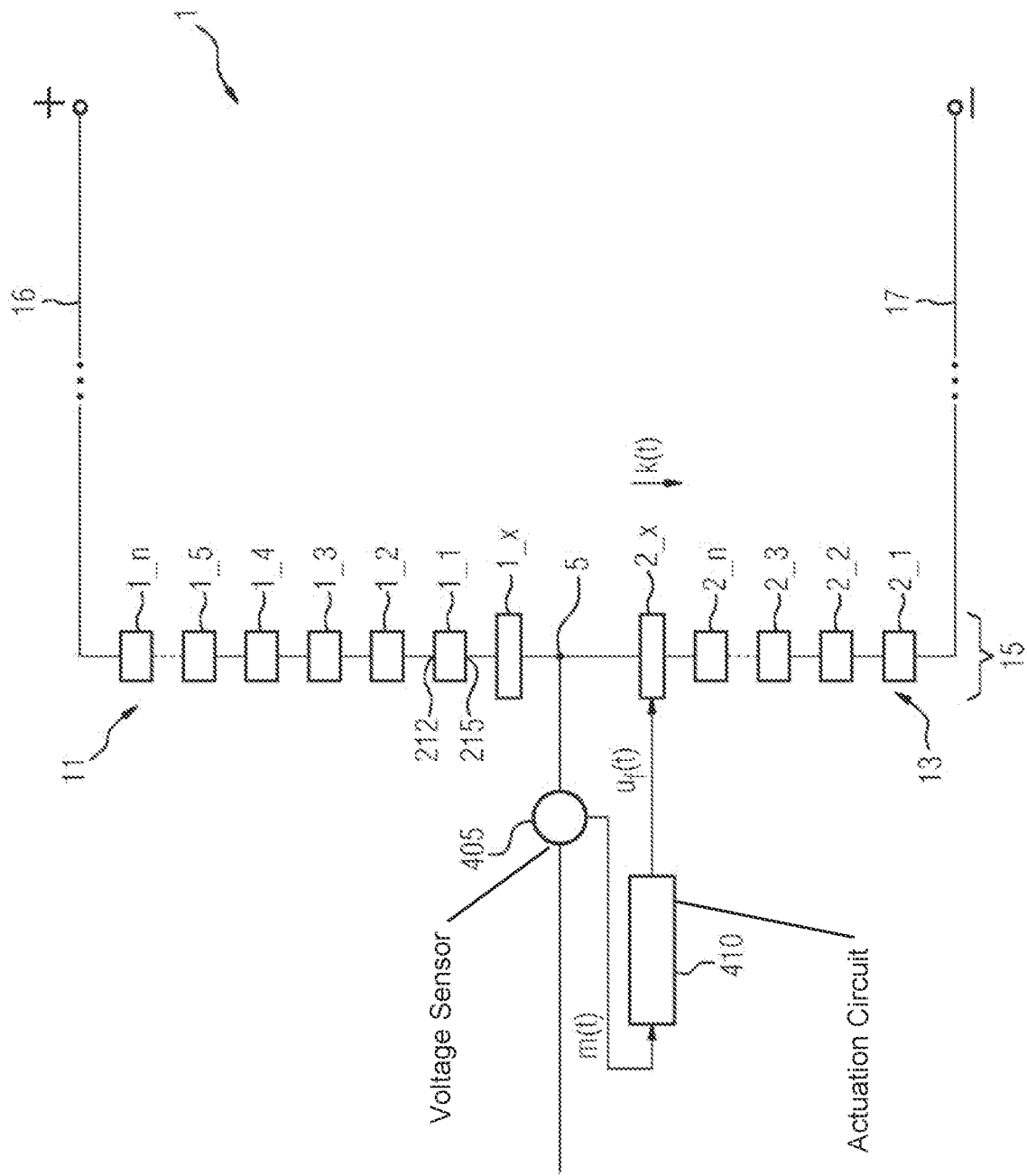

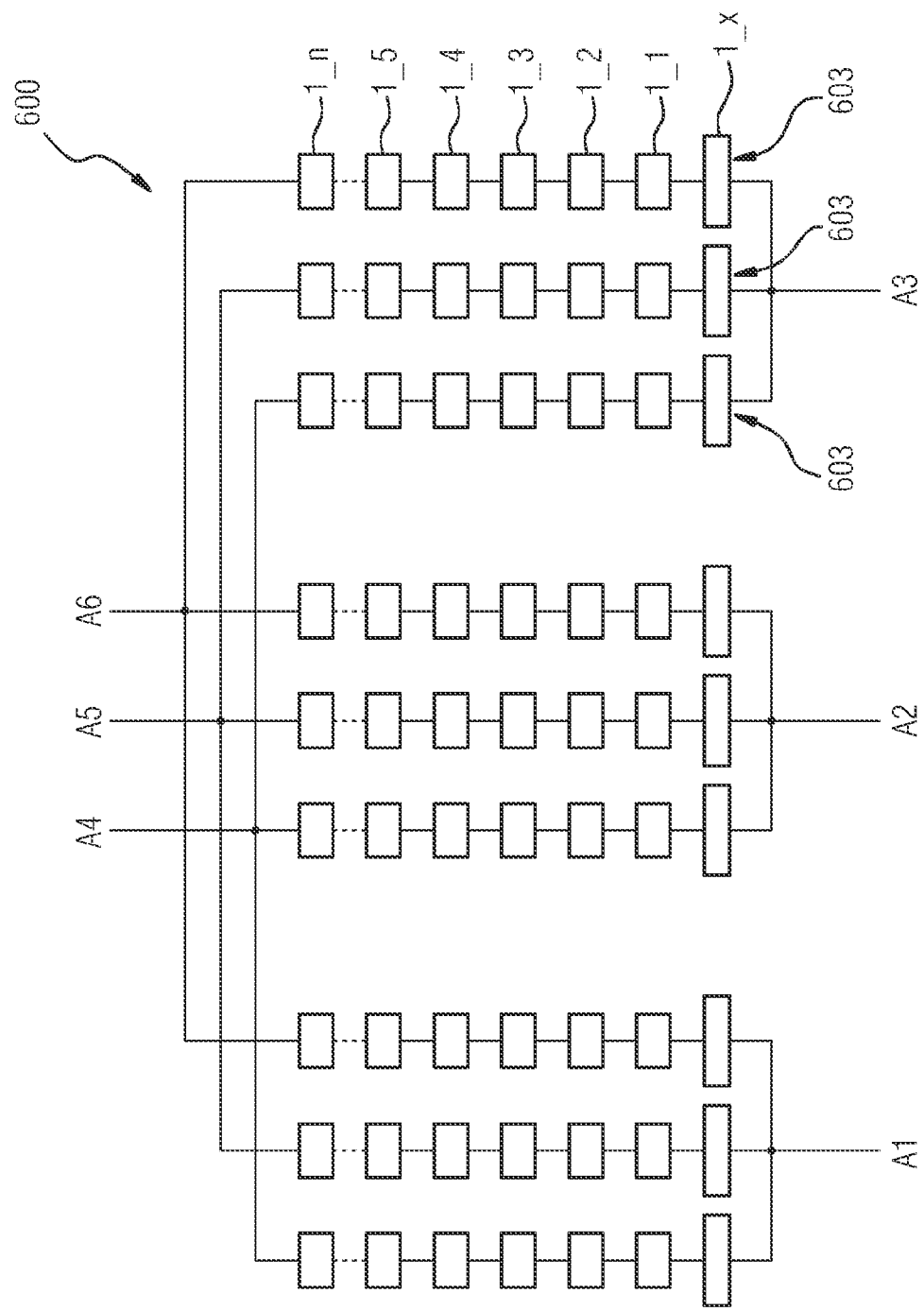

POWER CONVERTER REDUCING AN ERROR VOLTAGE GENERATED BY SWITCHING ELECTRONIC SWITCHING ELEMENTS

FIELD AND BACKGROUND OF THE INVENTION

The invention relates to a power converter comprising at least one phase module, which has a plurality of modules, which are electrically connected in series and wherein each module has a first electrical module connection, a second electrical module connection, a first electronic switching element, a second electronic switching element and an electrical energy store. The invention furthermore relates to a method for reducing an error voltage in a power converter.

During operation of such a power converter, the switching of the electronic switching elements produces undesired voltages (error voltages), which can result in particular in undesired broad bandwidth disturbance powers. Such error voltages can have significantly higher frequencies than the AC voltage applied to the power converter. As a result, undesired high-frequency emission of the power converter can arise. Such a power converter may be a modular multilevel converter, for example.

SUMMARY OF THE INVENTION

The invention is based on the object of specifying a power converter and a method using which makes it possible to reduce the generation of an undesired high-frequency disturbance power.

This object is achieved according to the invention by way of a power converter and a method as claimed in the independent patent claims. Advantageous embodiments of the power converter and the method are specified in the dependent patent claims.

A power converter comprising at least one phase module, which has a plurality of modules, which are electrically connected in series and wherein each module has a first electrical module connection, a second electrical module connection, a first electronic switching element, a second electronic switching element and an electrical energy store, wherein the phase module is assigned at least one controllable voltage source (voltage control device), which is suitable for generating a compensation voltage in response to a corresponding actuation, wherein the compensation voltage has a time profile such that it reduces a (high-frequency) error voltage generated by the switching of the first electronic switching elements and the second electronic switching elements of the modules. The high-frequency disturbance power (disturbance spectrum) generated by the power converter can be reduced as a result.

The power converter can be configured in such a way that the controllable voltage source has a transmission behavior with a broader bandwidth than the modules, in particular at higher frequencies. In other words, the controllable voltage source has a greater frequency range than the modules, in particular a greater frequency range than the first electronic switching element and the second electronic switching element of the modules. As a result, the error voltage generated by the switching of the electronic switching elements can be reliably reduced by means of the controllable voltage source.

The power converter can be configured in such a way that the phase module has an AC voltage connection, a first DC voltage connection and a second DC voltage connection. The power converter can then convert AC voltage to DC voltage (and vice versa).

The power converter can be configured in such a way that the controllable voltage source is arranged at one of the DC voltage terminals of the phase module, in particular at the DC voltage connection at which the lower electrical potential arises during operation of the power converter, and/or the controllable voltage source is arranged at the AC voltage connection of the phase module. When the controllable voltage source is arranged at one of the DC voltage connections of the phase module, in particular at the DC voltage connection at which the lower electrical potential arises during operation of the power converter, the controllable voltage source can then be supplied with electrical energy in a relatively simple manner. The controllable voltage source is then namely at a known electrical potential, with the result that the necessary electrical insulation/potential isolation is possible in a relatively simple manner. However, the controllable voltage source can also be arranged at the AC voltage connection of the phase module.

The power converter can be configured in such a way that the power converter has three phase modules, which have a common electrical connecting point at each of their DC voltage connections, and the controllable voltage source of the phase modules is arranged in each case at the end of the phase module allocated to the electrical connecting point. The power converter can then advantageously be of a three-phase configuration.

The power converter can be configured in such a way that the controllable voltage source is connected in series with the modules of the phase module. As a result, the compensation voltage generated by the controllable voltage source is added to the voltage of the modules of the phase module.

The power converter can also be configured in such a way that the controllable voltage source is arranged in an AC voltage feed line of the power converter. In this case, the controllable voltage source is connected in particular in series into the AC voltage feed line of the power converter. One connection of the controllable voltage source is in this 4 case electrically connected to the AC voltage connection of the phase module. The other connection of the controllable voltage source is remote from the AC voltage connection or faces away from the AC voltage connection. The controllable voltage source is thus arranged outside of the series circuit of the modules.

The power converter can be configured in such a way that the power converter has a first connection for an AC voltage and a second connection for an AC voltage or a DC voltage. When the power converter has two connections for a respective AC voltage, the power converter is then an AC-AC power converter. Such a power converter may be in particular a matrix power converter.

The power converter can be configured in such a way that the controllable voltage source has a lower rated voltage than the modules. The controllable voltage source can be realized for example as a module that is of an identical construction to the other modules of the phase module or of the power converter, but which has a lower rated voltage and a higher maximum switching frequency in comparison with the other modules.

Also disclosed is a method for reducing a (high-frequency) error voltage in a power converter, which has at least one phase module, which has a plurality of modules, which are electrically connected in series and wherein each module has a first electrical module connection, a second electrical module connection, a first electronic switching element, a second electronic switching element and an electrical energy store, and wherein the phase module is assigned at least one controllable voltage source, wherein in the method the controllable voltage source is actuated in such a way that it generates a compensation voltage, which has a time profile such that a (high-frequency) error voltage generated by the switching of the first electronic switching elements and the second electronic switching elements of the modules is reduced thereby. This reduces the (high-frequency) disturbance power/disturbance spectrum generated by the power converter.

The method can proceed in such a way that
the compensation voltage is coupled into the phase module.

The method can proceed in such a way that
a model, which has at least one phase module model for the phase module, a voltage source model for the controllable voltage source and a disturbance model for the error voltage, is used to actuate the controllable voltage source,
a model error is ascertained as the difference between a measurement variable measured at the power converter and the associated model variable determined by means of the model, and
the model error is fed back to the model in weighted form by means of at least one feedback matrix.

The method can proceed in such a way that
an observer is used to actuate the controllable voltage source, and
in response to changes in the spectral properties of the measurement variable after the spectral analysis thereof, the dynamics of the observer are dynamically adjusted to the changed spectral properties, in particular by transferring the feedback matrices to a new set of feedback matrices.

This adjusts the observer to the spectrum that is of interest.

The method can proceed in such a way that
a model of at least the first order is used as disturbance model, in particular a model with an I-component as model of the first order and/or a model of the second order for estimating sinusoidal oscillations.

The method can proceed in such a way that
the phase module model and/or the voltage source model each have a linear model portion and a non-linear model portion.

The non-linear model portion is used for example to model a dead time characteristic and switching characteristic, in particular a hysteresis.

The method can proceed in such a way that
an integration increment for a time-discrete value calculation is adjusted to the period of the AC voltage applied to the power converter, in particular an integer factor of the period is selected as integration increment. The integer factor may be in particular a power of two.

The method can proceed in such a way that
the non-linear switching behavior of the first electronic switching element and of the second electronic switching element of the modules is modeled by means of the non-linear model portion.

The method can proceed in such a way that
dead times of the non-linear switching behavior of the first electronic switching element and of the second electronic switching element are modeled by means of the non-linear model portion of the phase module model.

This corresponds to a non-correcting observer.

The method can proceed in such a way that
a time-discrete filter is used as linear model portion and/or the non-linear model portion is simulated by means of a predictive Euler method. A predictive Euler method constitutes a time-performant method that operates comparatively quickly.

The method can proceed in such a way that
a value calculation by means of the non-linear model portion is carried out at a higher frequency and a lower integration increment than a value calculation by means of the linear model portion, in particular at an at least approximately five times higher frequency. A kind of oversampling is thus carried out in the value calculation by means of the non-linear model portion.

The method can proceed in such a way that
estimated values for the actuation of the first electronic switching element and of the second electronic switching element of the modules are ascertained by means of the model and these estimated values are output.

The described arrangement and the described method have identical or similar advantages. The invention is explained in more detail in the following text with reference to exemplary embodiments. Identical reference signs in this case refer to identical elements or elements with an identical effect. To this end, in the figures.

BRIEF DESCRIPTION OF THE FIGURES

FIG. 1 shows an exemplary embodiment of a power converter comprising three phase modules,
FIG. 4 shows an exemplary phase module comprising a controllable voltage source,
FIG. 6 shows a further exemplary embodiment of a power converter in the form of a matrix power converter.

DETAILED DESCRIPTION OF THE INVENTION

Figure 3:
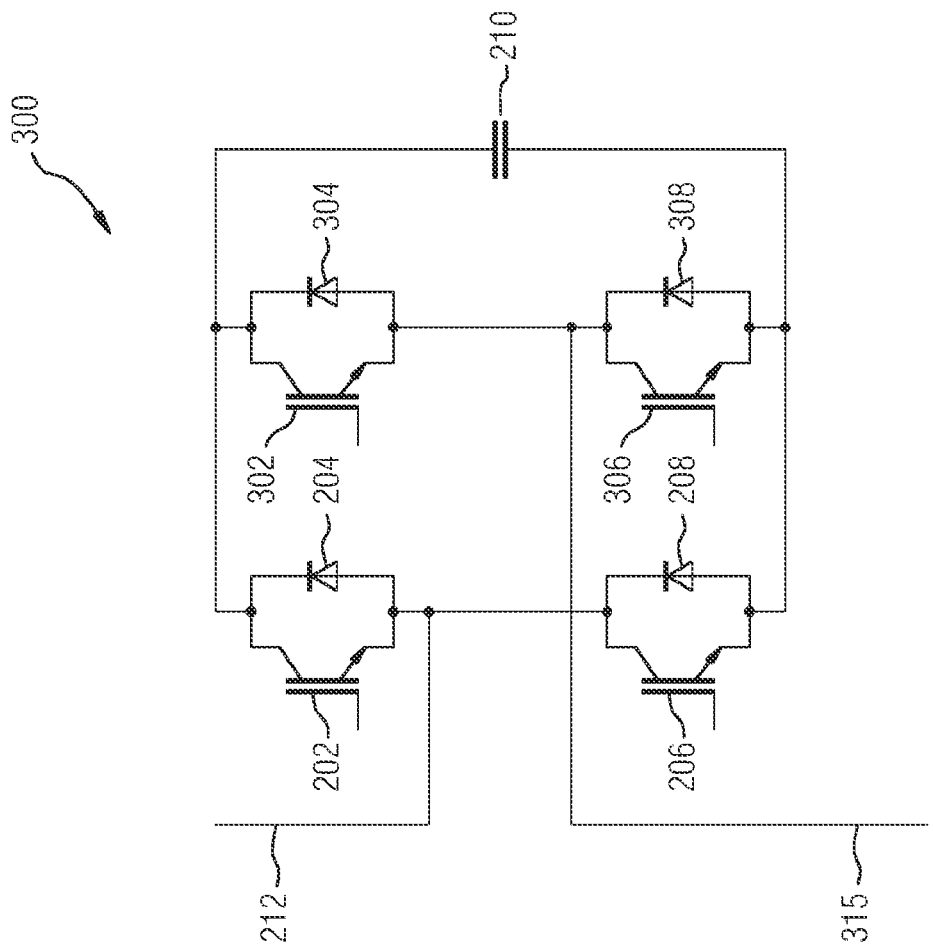
FIG. 3 shows a further exemplary embodiment of a module of the power converter.

FIG. 1 illustrates an exemplary embodiment of a power converter 1 in the form of a modular multilevel power converter 1. Said multilevel power converter 1 has a first AC voltage connection 5, a second AC voltage connection 7 and a third AC voltage connection 9. The first AC voltage connection 5 is electrically connected to a first phase module branch 11 and a second phase module branch 13. The first phase module branch 11 and the second phase module branch 13 form a first phase module 15 of the power converter 1. The end of the first phase module branch 11 that is remote from the first AC voltage connection 5 is electrically connected to a first DC voltage connection 16; the end of the second phase module branch 13 that is remote from the first AC voltage connection 5 is electrically connected to a second DC voltage connection 17. The first DC voltage connection 16 is a positive DC voltage connection; the second DC voltage connection 17 is a negative DC voltage connection.

The second AC voltage connection 7 is electrically connected to one end of a third phase module branch 18 and to one end of a fourth phase module branch 21. The third phase module branch 18 and the fourth phase module branch 21 form a second phase module 24. The third AC voltage connection 9 is electrically connected to one end of a fifth phase module branch 27 and to one end of a sixth phase module branch 29. The fifth phase module branch 27 and the sixth phase module branch 29 form a third phase module 31.

The end of the third phase module branch 18 that is remote from the second AC voltage connection 7 and the end of the fifth phase module branch 27 that is remote from the third AC voltage connection 9 are electrically connected to the first DC voltage connection 16. The end of the fourth phase module branch 21 that is remote from the second AC voltage connection 7 and the end of the sixth phase module branch 29 that is remote from the third AC voltage connection 9 are electrically connected to the second DC voltage connection 17. The first phase module branch 11, the third phase module branch 18 and the fifth phase module branch 27 form a positive-side power converter portion 32; the second phase module branch 13, the fourth phase module branch 21 and the sixth phase module branch 29 form a negative-side power converter portion 33.

Each phase module branch has a plurality of modules (1_1, 1_2, 1_3, 1_4 . . . 1_n; 2_1 . . . 2_n; etc.), which are electrically connected in series (by means of the module connections thereof). Such modules are also referred to as submodules. In the exemplary embodiment of FIG. 1, each phase module branch has n modules. The number of modules that are electrically connected in series by means of the module connections thereof can be very different, at least three modules are connected in series; however, for example 50, 100 or more modules can also be electrically connected in series. In the exemplary embodiment, n=36: the first phase module branch 11 thus has 36 modules 1_1, 1_2, 1_3, . . . 1_36. The other phase module branches 13, 18, 21, 27 and 29 have a similar construction. Each of the modules 1_1 . . . 6_n has at least one first electronic switching element and one second electronic switching element, cf. FIGS. 2 and 3.

The left-hand region of FIG. 1 schematically illustrates a control device 35 for the modules 1_1 to 6_n. Optical messages or optical signals are transmitted from said central control device 35 to the individual modules via an optical communication link 37 (for example via an optical waveguide). The transmission of messages between the control device and a module is illustrated in each case symbolically by a line 37; the direction of the transmission of messages is symbolized by the arrow heads on the lines 37. This is illustrated using the example of the modules 1_1, 1_4 and 4_5; messages are sent to the other modules and messages are received by said modules in the same manner. By way of example, the control device 35 sends a respective setpoint value for the switching state of the electronic switching elements to the individual modules.

The first phase module 15 is assigned at least one controllable voltage source. In the exemplary embodiment, the first phase module 15 is assigned a first controllable voltage source 1_x and a second controllable voltage source 2_x. The first controllable voltage source 1_x and the second controllable voltage source 2_x are set up to generate a compensation voltage in response to a corresponding actuation. In this case, the compensation voltage has a time profile such that the compensation voltage reduces a (high-frequency) error voltage generated by the switching of the first electronic switching elements and the second electronic switching elements of the modules and as a result reduces the high-frequency disturbance power (disturbance spectrum) generated by the power converter.

In the exemplary embodiment, the first phase module branch 11 comprises the first controllable voltage source 1_x; the second phase module branch 13 comprises the second controllable voltage source 2_x. The first controllable voltage source 1_x and the second controllable voltage source 2_x are each arranged at the first AC voltage connection 5 of the first phase module 15.

The first controllable voltage source 1_x is connected in series with the modules 1_1 . . . 1_n of the first phase module branch 11 of the first phase module 15. As a result, the compensation voltage generated by the first controllable voltage source 1_x is added to the voltage of the modules 1_1 . . . 1_n of the first phase module branch 11 of the first phase module 15. The second controllable voltage source 2_x is connected in series with the modules 2_1 . . . 2_n of the second phase module branch 13 of the first phase module 15 in a similar manner. As a result, the compensation voltage generated by the second controllable voltage source 2_x is added to the voltage of the modules 2_1 . . . 2_n of the second phase module branch 13 of the first phase module 15.

However, the controllable voltage source or the controllable voltage sources can also be arranged at another location of the first phase module 15. For example, the controllable voltage source can be arranged at one of the DC voltage connections of the phase module or in each case one controllable voltage source can be arranged at both DC voltage connections of the phase module. By way of example, instead of the first controllable voltage source 1_x (adjacent to the first AC voltage connection 5), a first controllable voltage source 1_x' can be arranged at one of the DC voltage connections of phase module (in this case at the first DC voltage connection 16). Likewise, instead of the second controllable voltage source 2_x (adjacent to the first AC voltage connection 5), a second controllable voltage source 2_x' is arranged at the other of the DC voltage connections of the phase module (in this case at the second DC voltage connection 17). In particular, it is advantageous when the controllable voltage source is arranged at the DC voltage connection at which the lower electrical potential arises during operation of the power converter (this is the second DC voltage connection 17 in the example). The controllable voltage source can then be supplied with electrical energy and actuated particularly easily because the potential isolation is relatively easy to implement.

As a further example, the controllable voltage source can be arranged in an AC voltage feed line 40 of the power converter, said feed line being connected to the AC voltage connection 5. By way of example, instead of the first controllable voltage source 1_x (adjacent to the first AC voltage connection 5) and second controllable voltage source 2_x, a controllable voltage source 1_y can be arranged in the AC voltage feed line 40 to the first AC voltage connection 5 of the power converter. In this case, the controllable voltage source 1_y can be connected in particular in series into the AC voltage feed line 40 of the power converter. One connection of the controllable voltage source 1_y is in this case electrically connected to the first AC voltage connection 5 of the first phase module 15. The other connection of the controllable voltage source 1_y is remote from the first AC voltage connection 5 or faces away from the first AC voltage connection 5. The controllable voltage source 1_y is thus arranged outside of the series circuit of modules 1_1 ... 1_n or 2_1 ... 2_n. As a further example, the controllable voltage source can also be arranged in a DC voltage feed line of the power converter, said line being connected to one of the DC voltage connections 16 or 17, that is to say the controllable voltage source can also be arranged in the DC voltage circuit of the power converter.

Figure 2:
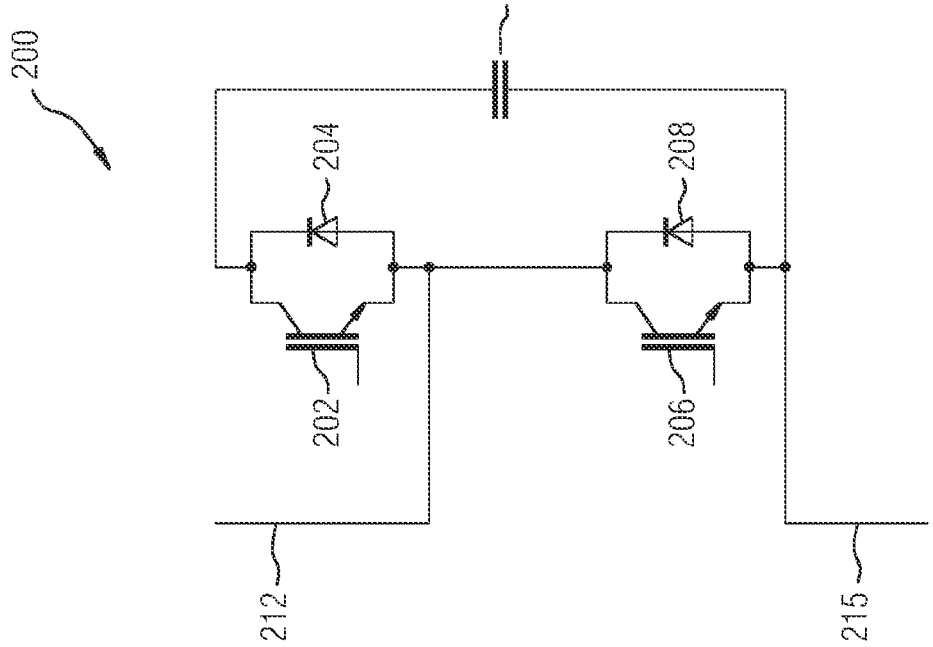
FIG. 2 shows an exemplary embodiment of a module of the power converter.

FIG. 2 illustrates an exemplary embodiment of a module 200 of the power converter 1. The module may be one of the modules 1_1 ... 6_n illustrated in FIG. 1, for example.

The module 200 is configured as a half-bridge module 200. The module 200 has a first (disconnectable) electronic switching element 202 (first disconnectable semiconductor valve 202) comprising a first diode 204 connected in antiparallel. The module 200 also has a second (disconnectable) electronic switching element 206 (second disconnectable semiconductor valve 206) comprising a second diode 208 connected in antiparallel and an electrical energy store 210 in the form of a capacitor 210. The first electronic switching element 202 and the second electronic switching element 206 are each configured as an IGBT (insulated-gate bipolar transistor). The first electronic switching element 202 is electrically connected in series with the second electronic switching element 206. A first electrical module connection 212 is arranged at the connecting point between the two electronic switching elements 200 and 206. A second electrical module connection 215 is arranged at the connection of the second electronic switching element 206, which is located opposite the connecting point. The second module connection 215 is also electrically connected to a first connection of the energy store 210; a second connection of the energy store 210 is electrically connected to the connection of the first electronic switching element 202, which is located opposite the connecting point.

The energy store 210 is thus electrically connected in parallel with the series circuit composed of the first electronic switching element 202 and the second electronic switching element 206. Through appropriate actuation of the first electronic switching element 202 and the second electronic switching element 206 by way of a control device of the power converter, it is possible to achieve a situation in which either the voltage of the energy store 210 is output between the first module connection 212 and the second module connection 215 or no voltage is output (that is to say a zero voltage is output). The respectively desired output voltage of the power converter can thus be generated through interaction of the modules of the individual phase module branches.

FIG. 3 illustrates a further exemplary embodiment of a module 300 of the power converter 1. The module 300 may be for example one of the modules 1_1 ... 6_n illustrated in FIG. 1. In addition to the first electronic switching element 202, second electronic switching element 206, first free-wheeling diode 204, second free-wheeling diode 208 and energy store 210 already known from FIG. 2, the module 300 illustrated in FIG. 3 has a third electronic switching element 302 comprising a third free-wheeling diode 304 connected in antiparallel and a fourth electronic switching element 306 comprising a fourth free-wheeling diode 308 connected in antiparallel. The third electronic switching element 302 and the fourth electronic switching element 306 are each configured as an IGBT. In contrast to the circuit from FIG. 2, the second electrical module connection 315 is not electrically connected to the second electronic switching element 206 but to a center point (connecting point) of an electrical series circuit composed of the third electronic switching element 302 and the fourth electronic switching element 306.

The module 300 of FIG. 3 is what is known as a full-bridge module 300. This full-bridge module 300 is characterized in that, when four electronic switching elements between the first electrical module connection 212 and the second electrical module connection 315 are actuated accordingly, selectively either the positive voltage of the energy store 210, the negative voltage of the energy store 210 or a voltage of the value zero (zero voltage) can be output. The polarity of the output voltage can thus be reversed by means of the full-bridge module 300. The multilevel power converter 1 can comprise either only half-bridge modules 200, only full-bridge modules 300 or else half-bridge modules 200 and full-bridge modules 300.

FIG. 4 illustrates by way of example the first phase module 15 comprising the second controllable voltage source 2_x in more detail. The second controllable voltage source 2_x is arranged in the second phase module branch 13 of the first phase module 15 adjacent to the first AC voltage connection 5. The instantaneous value of the AC voltage at the first AC voltage connection 5 is measured as a (single-phase) measurement voltage m(t) by means of a voltage sensor 405. Said measurement voltage m(t) is fed to an actuation circuit 410. A model-supported signal feedback is carried out in the actuation circuit 410, as is described in connection with FIG. 5. The second controllable voltage source 2_x is actuated by the actuation circuit 410 by means of an actuation signal $u_f(t)$. The second controllable voltage source 2_x generates the compensation voltage k(t) in response to the actuation signal $u_f(t)$. The compensation voltage k(t) is fed into the first phase module in series with the modules 2_1 ... 2_n. Said compensation voltage k(t) reduces the high-frequency error voltage generated by the switching of the first electronic switching elements and the second electronic switching elements of the modules and as a result reduces the high-frequency disturbance power output generated by the power converter. In the ideal case, the error voltage is compensated for completely. The first controllable voltage source 1_x is actuated in a similar manner.

Figure 5:
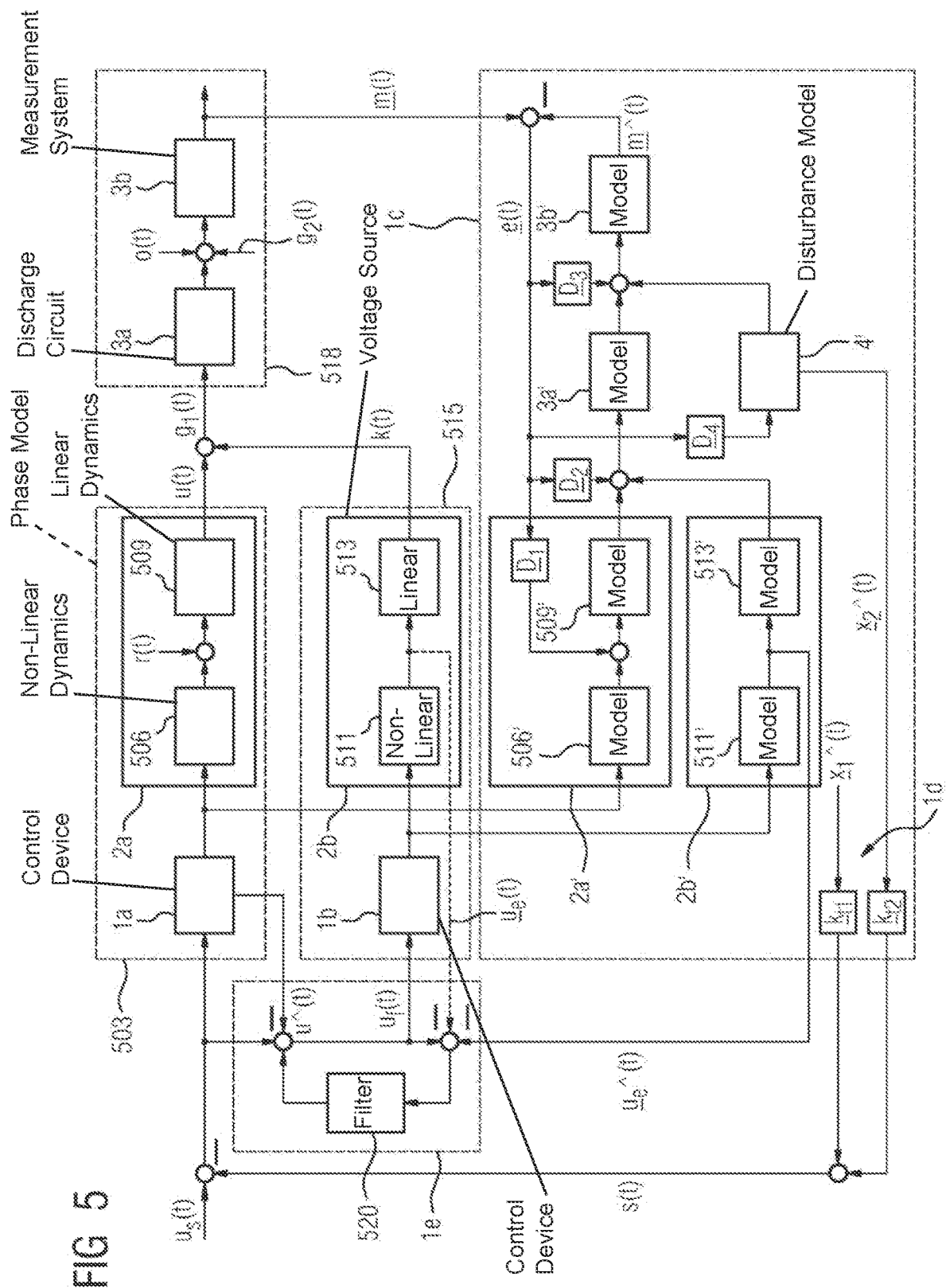
FIG. 5 shows an exemplary embodiment of model-supported signal feedback.

FIG. 5 illustrates an exemplary embodiment of the actuation of a controllable voltage source 2b; this may be for example the second controllable voltage source 2_x. The other controllable voltage sources can be actuated in a similar manner. First an overview of the exemplary embodiment of FIG. 5 is given. Further details follow.

The top part of FIG. 5 illustrates by way of example the modules 2a of a phase module of the power converter together with the control device 1a (power converter controller 1a). The modules 2a and the control device 1a form a phase module 503, known from the prior art, with controller. Such a phase module 503 is also referred to as power converter branch 503, converter branch 503 or power converter string 503. The power converter generally has a plurality of phase modules 503, of which only one is illustrated in FIG. 5.

The modules 2a connected in series have non-linear dynamics 506, affected by dead times, and linear dynamics 509. This is illustrated by way of example as block 506 "non-linear switching behavior" and as block 509 "linear dynamics". By way of example, a quantization noise r(t), which represents the noise due to the discrete voltage steps of the individual modules, is added at the connecting point between the block 506 "non-linear switching behavior" and the block 509 "linear dynamics".

The control device 1a is a currently conventional control device 1a of the power converter. A power converter setpoint voltage $u_s(t)$ is fed to the control device 1a. The control device 1a actuates the modules 2a with a setpoint value for the output voltage u(t) of the phase module 503 (string voltage u(t)), but there is no optimizing regulation in the control device 1a for suppressing for example sinusoidal disturbances and for reducing the quantization noise.

The output voltage u(t) of the phase module 503 is added to an output voltage k(t) (compensation voltage k(t)) of a controllable voltage source 2b; the result of the addition is a total phase module voltage g1(t) of the phase module 503. The controllable voltage source 2b (like the modules 2a connected in series) have non-linear dynamics, affected by dead times, and linear dynamics. This is illustrated by way of example as block 511 "non-linear switching behavior" and as block 513 "linear dynamics". The controllable voltage source 2b is assigned a voltage source control device 1b.

The controllable voltage source 2b and the voltage source control device 1b form an additional controllable voltage source unit 515 of the power converter, which unit has high dynamics (higher than the dynamics of the phase module 503).

The phase module 503 is thus extended by the controllable voltage source 2b with associated actuation (1b). Since the controllable voltage source 2b has in particular smaller voltage steps than the modules 2a connected in series, the relatively rough value quantization of the phase module 503 is reduced as a result.

The controllable voltage source 2b has better (that is to say higher) non-linear dynamics, but which are likewise affected by dead times, and also better/higher linear dynamics than the modules 2a connected in series. The controllable voltage source 2b can in this case be configured as a special module that has a lower rated voltage and a higher maximum switching frequency in comparison to the other modules. Otherwise, the controllable voltage source 2b can have a similar construction to one of the modules 2a.

The interconnection of the modules 2a and the controllable voltage source 2b generates the first total phase module voltage g1(t), which is connected to an energy network via a discharge line (discharge circuit). A block 3a symbolizes the dynamics/the dynamic properties of the discharge line. The quantization errors in the total phase module voltage g1(t) are reduced on account of the controllable voltage source.

Downstream of the block 3a of the discharge line, a second total phase module voltage g2(t) of a second phase module and the network voltage of the energy network including harmonics o(t) are superposed such that a measurement system 3b with its specific dynamics outputs a distorted measurement voltage m(t) (that is to say a distorted measurement signal m(t)). The measurement system having a measurement sensor with its dynamic properties is illustrated by way of example as block 3b. The discharge line and the measurement system are constituent parts of a controlled system with measurement element 518.

The measurement system thus acquires the power converter total output voltage g(t) including network feedback and/or disturbances. The measurement system outputs the measurement voltage $\underline{m}$(t). The three-phase measurement voltage $\underline{m}$(t) is illustrated as a vector.

The measurement signal $\underline{m}$(t) can in particular be oversampled and limited digitally to the bandwidth of the observer illustrated in the bottom part of FIG. 5. This is not illustrated in FIG. 5.

The bottom part of FIG. 5 illustrates a regulation device 1c, which is designed in particular as a digital regulation device 1c. The modules 2a connected in series, the controllable voltage source 2b, the dynamics/dynamic properties of the discharge circuit 3a and the dynamics/dynamic properties of the measurement system 3b as well as the interconnection thereof are simulated in the regulation device 1c. Accordingly, the digital regulation device 1c has a phase module model 2a' (particular a model 2a' of the modules connected in series), a voltage source model 2b' (model 2b' of the controllable voltage source), a model 3a' of the discharge line and a model 3b' of the measurement system.

The phase module model 2a' has (in accordance with the phase model 2a) a model 506' of the non-linear dynamics (affected by dead times)/the non-linear switching behavior and a model 509' of the linear dynamics. The voltage source model 2b' has (in accordance with the controllable voltage source 2b) a model 511' of the non-linear characteristics/non-linear switching behavior and a model 513' of the linear dynamics.

The digital regulation device 1c also has a model 4' for any sinusoidal disturbance signals/disturbance oscillations (disturbance model 4' for the error voltage). The estimated values for the disturbance signals (output values of the disturbance module 4') are fed in exactly where the network disturbances are taking effect in the real system. However, other disturbance models can also be used.

By way of the models, it is possible to obtain access to simulated internal variables (state variables) of the modules 2a, the controllable voltage source 2b, the discharge line 3a and the measurement system 3b. These internal variables are useful for generating the compensation voltage but without the models are not easily able to be tapped digitally (that is to say are not able to be measured easily).

The output variables of the individual models are combined; the result is an estimated value $\underline{\hat{m}}$(t) of the measurement voltage $\underline{m}$(t) ascertained by means of models. In order to minimize the unavoidable estimation errors for the variables simulated by means of the models, the simulated variables are corrected using the deviations $\underline{e}$(t) between the measurement variables m (in this case the measurement voltage m(t)) and their estimated values $\hat{m}$ (in this case estimated values $\underline{\hat{m}}$(t)) by means of feedback matrices D. The result is what is known as an observer system; the regulation device 1c has a non-linear system observer with a disturbance model for disturbance suppression. A model error e(t) is thus formed according to $\underline{e}(t)=\underline{m}(t)-\underline{\hat{m}}(t)$. Said model error e(t) is fed back in order to correct the state variables of the model.

The (optimized) control law 1d of the regulation device 1c consists of the linear weighting ($\underline{k}$ $\underline{\hat{x}}$) of the estimated variables $\underline{\hat{x}}$ (state variables $\underline{\hat{x}}$) by means of weighting vectors $\underline{k}$. In this case, $\underline{x}_j\hat{}(t)$ are state variables of the system model [which of the aforementioned models?] and $\underline{x}_2\hat{}(t)$ are state variables of the disturbance model 4'. The state variables $\underline{x}_1\hat{}(t)$ have a weighting vector $\underline{k}_{r1}$ applied to them; the state variables $\underline{x}_2\hat{}(t)$ have a weighting vector $\underline{k}_{r2}$ applied to them.

The resulting control signal s(t) is superposed on the setpoint value $u_s(t)$ for the phase module voltage (in this case the power converter setpoint voltage $u_s(t)$). The control signal s(t) influences the power converter in such a way that, in the case of the modeled disturbances arising, these disturbances are identified and suppressed.

To further reduce the quantization noise of the combination of the power converter string 2a (series circuit of modules 2a) with the special module 2b (controllable voltage source 2b), the error between the desired control signal $u_f(t)$ and the actual control signal $\underline{u}_e(t)$ or the estimated value $\underline{u}_e\hat{}(t)$ thereof can be suitably deformed by means of a noise shaping filter 520 and repeatedly fed forward (noise shaping and control error correction 1e). As a result, the stationary accuracy of the overall arrangement is improved and the quantization noise thereof is shifted from the useful range, that is to say displaced into a non-critical/safe frequency range. The overall arrangement can safely dispose of the noise power there, that is to say can convert it into heat.

The control device 1a of the power converter generates control sequences based on which the voltages of the capacitors of modules 2a are interconnected with the desired output voltage. The expected value $u\hat{}(t)$ of the output voltage $u(t)$ of the phase module (that is to say of the branch voltage $u(t)$) can be drawn from the converter controller 1a.

The difference between the expected control value $u\hat{}(t)$ of the phase module and the required control value at the input of the control device 1a of the phase module is the voltage error $u_f(t)$. If said voltage error $u_f(t)$ is not available/cannot be measured, it can be estimated by way of a model.

Further details regarding the exemplary embodiment are specified below.

The electronic switching elements of the modules 2a (also referred to as switches for short) have a non-linear switching characteristic, that is to say a response time and a switching time, illustrated as block 506 "non-linear switching behavior". The electronic switching elements run through a non-linear current-voltage characteristic curve during switching. They also have to be actuated for a certain amount of time in order that they switch reliably at all. This can be modeled as a minimum actuation period with hysteresis in switching continuance.

The current buildup owing to the electronic switching elements has linear dynamics (illustrated as block 509 "linear dynamics") and has an effect on the voltage buildup of the output voltage $u(t)$ of the phase module 503 (string voltage $u(t)$).

The summation voltage of the interconnected capacitors of the modules 2a cannot assume any desired value. There are voltage steps that are virtually constant up to the next switching sequence. This step-like voltage profile corresponds to that of a value quantizer, the error of which with respect to the desired voltage can be interpreted as superposed quantization noise. The quantization noise has a DC component with a superposed discharge ramp of the capacitances, that is to say the quantization noise has a harmonic at three times the frequency of the switching frequency.

The voltage error $u_f(t)$ is fed to the voltage source control device 1b, which actuates the controllable voltage source 2b connected in series. The output voltage of the controllable voltage source 2b is added to the output voltage $u(t)$ of the phase module 503.

The non-linear characteristic 511 of the controllable voltage source 2b is similar to the non-linear characteristic 506 of the series circuit of modules 2a or the individual electric switching elements thereof. However, the non-linear characteristic 511 of the controllable voltage source 2b is quicker than the non-linear characteristic 506 of the series circuit of modules 2a. The dynamics 513 of the controllable voltage source 2b are also (significantly) quicker than the dynamics 509 of the series circuit of modules 2a. The controllable voltage source 2b is therefore capable of generating the high-frequency compensation voltage $k(t)$ that is superposed on the voltage of the phase module 503.

The actual switching behavior of the electronic switching elements of the control voltage source 2b can be acquired in some circumstances metrologically (symbolized by the dashed line leaving the control voltage source 2b, real active control signal $\underline{u}_e(t)$). Otherwise, the switching behavior can be estimated by means of a model (estimated active control signal $\underline{u}_e\hat{}(t)$).

The difference from the desired control signal $u_f(t)$ and the actually implemented control signal $\underline{u}_e(t)$ or $\underline{u}_e\hat{}(t)$ is fed to the noise shaping filter 520 of the control error correction 1e. The noise shaping filter 520 does not only register implementation errors, accumulate them and collect them later (conventional I-controller), but also deforms the error signal to high frequencies (noise shaping). Said higher-frequency signal arising downstream of the non-linear switching behavior 511 of the additional controllable voltage source 2b is smoothed by the linear dynamics 513 of the additional controllable voltage source 2b.

With this second path (that is to say the controllable voltage source 2b with the output voltage $k(t)$, which is connected in parallel with the modules (phase module) 2a connected in series at the output voltage $u(t)$), it is thus possible to influence the phase module voltage $u(t)$ in a relatively high-frequency manner: on the one hand in order to balance static (quantization) errors, on the other hand in order to compensate for the discharge ramp of the capacitors as well as disturbances from the network, provided these can be measured or estimated.

Arranged in parallel with the controlled system 518 with control element (modules 2a connected in series, with controllable voltage source 2b) and measurement system 3b is a model of these components, said model being implemented as a conventional Luenberger observer. While a feedback D3 (feedback matrix D3 to the input of the model of the measurement system 3b') can be adjusted in the frequency range using conventional means, the corrections D1 and D2 (feedback matrix D1 for model 2a' of the series circuit of the modules, feedback matrix D2 for the model of the discharge line) are carried out in particular based on a Kalman approach with a stationary Wiener solution.

With knowledge of the spectrum of the quantization noise (FFT of the simulated noise) and the useful bandwidth, the feedback can be adjusted by means of the feedback matrices D in a correspondingly low-frequency manner.

The feedback D4 (feedback matrix D4) actuates the disturbance model 4' for the error voltage. A model of at least the first order is preferably used as disturbance model 4': this may be in particular a model with an I component as model of the first order and/or a model of the second order for estimating sinusoidal oscillations/disturbance voltages/error voltages. The I component is used to suppress stationary faults.

Estimated values for the actual actuation of the linear components of the electronic switching elements can be drawn from the models if they are not provided otherwise.

The non-linear switching behaviors 506, 511 have dead times that can be interpreted as non-corrected observers and can be modeled particularly well in discrete terms.

The left-hand part of FIG. 5 shows the feedback of the disturbance observer to the input of the system. In particular, undesired harmonics can be reduced thereby by means of the rapid dynamics of the controllable voltage source 2b. Conventional state regulation is used here. Where necessary, other state variables can also be fed back for this purpose if the coefficients thereof cannot be calculated to zero.

The linear dynamics can be modeled in the Z range as a digital filter according to Z transformation. In contrast thereto, the non-linear characteristic can be determined in the model preferably in a non-linear manner using a predictive Euler method with a higher bandwidth. As a result, the respective variables, in particular the estimated variables of the actual control signals, can be ascertained more accurately.

FIG. 6 illustrates a further exemplary embodiment of a power converter 600. The power converter 600 has nine phase modules 603. The phase modules form three groups of in each case three phase modules. Each phase module 603 has a plurality of modules 1_1 . . . 1_n and a controllable voltage source 1_x. In the exemplary embodiment, the modules 1_1 . . . 1_n and the controllable voltage source 1_x are electrically connected in series.

A first three-phase AC voltage can be fed to the power converter at three connections A1, A2 and A3; a second three-phase AC voltage can be drawn from the power converter at three connections A4, A5 and A6 (and vice versa). The power converter is a matrix power converter.

A power converter and a method using which the occurrence of an undesired high-frequency voltage can be reduced or virtually prevented have been described. Said power converter and said method are particularly advantageously able to be used in the high-voltage range, for example in high-voltage DC transmission. However, the power converter and the method are also able to be used advantageously in other voltage ranges, for example at low voltage or at medium voltage.

Known arrangements for converting electrical energy have in common the fact that they are arranged between at least two energy networks, transmit energy and in the process satisfy the connection rules of the networks. Transformers achieve this in a simple manner using possibly present additional interconnection with concentrated (high-voltage) components such as capacitors, inductors, switches etc. Transformers behave in a first approximation themselves like a combination of such concentrated components. Although modern power converters with connected power electronics systems have until now often been handled in this way, a disadvantage of this technology that they also generate a broadband disturbance power caused by switching in addition to harmonics at integer multiples of the network frequency is increasingly arising due to enhanced requirements with respect to the line-associated and field-associated disturbance powers. This could become significant in the future due to changed legislation regarding line-related compatibility and HF emission.

Until now, harmonics have conventionally been filtered out of the energy stream by absorption circuits, that is to say combinations of coils and capacitances, that is to say converted into heat with efficiency losses. In the case of broadband disturbance power, this is inefficient and costly in terms of device technology; furthermore, the entire system has to be configured for the higher active and reactive power demand.

The solution described is based on extending the conventional narrow-band phase modules by in each case at least one additional highly dynamic voltage control element (controllable voltage source) for the compensation of high-frequency power components of the phase module/power converter string. Said controllable voltage source can be arranged in particular on the lower voltage end of the branch. In the case of a three-phase power converter comprising three phase modules, the three additional controllable voltage sources can form a star point and draw their energy in each case from an internal store and/or from a connected energy network.

The actuation of each controllable voltage source is based on the estimation of the disturbance spectrum generated by the respective phase module (for example by means of a Kalman filter with disturbance observer, for example of at least the third order) and a suitable negative forward feed with quantization error compensation. By way of example, the disturbance observer can be tracked using wireless measurement technology for acquiring the high-frequency power stream. Here, the characteristic of the controllable voltage source is firstly taken into account in a linear manner and the behavior of the respective phase module (in particular the switching behavior) is simulated partially in a non-linear manner.

By way of example, a rapid module or else a system of drive engineering (drive controller) or medical engineering (gradient amplifier) can be used as controllable voltage source. By way of example, the controllable voltage source can be arranged in series with the respective branch, in parallel with a first module of the branch (where appropriate plus load resistor) or as a modified first module of the branch. The proximity of said controllable voltage sources in the three branches to their common star point or ground point is advantageous here. This results in a common reference point, a reference point for the energy draw of said controllable voltage sources, a particularly advantageous situation for control engineering of said three systems and/or an advantageous option for taking into account the mutual influences thereof.

In addition to the disturbance spectra of the branches, active harmonic compensation in the network can also be operated using the controllable voltage source when the observer is extended by models for the network and the disturbance modes (for example certain harmonics) and the installation is extended by suitable measurement technology for the network characteristic variables. The different measurement points (sensor system for network compensation or sensor system for intrinsic compensation) can have in particular a certain topological range and signal-theoretical decoupling. The observer is advantageously tracked with different dynamics depending on the band characteristics of the disturbance spectra.

In principle, the respective phase module can also be extended at the high-voltage end by the controllable voltage source. However, suitable additional measurement technology at high-voltage potential is then necessary, which could be implemented significantly more easily at the low-voltage star point. A suitable communication link to the components at a high-voltage level is then also advantageous.

The combination of conventional phase modules (in particular high-voltage phase modules) each comprising a controllable voltage source, which is designed in particular for compensation of system-induced harmonics and disturbance spectra, is thus advantageous. As a result, the properties of the established system (phase module) can be supplemented with the advantageous properties of the additional system (controllable voltage source).

In particular, compensation of network-related harmonics and disturbance spectra can advantageously take place into the higher kilohertz range up to the amplitude limit of the additional system. Furthermore, the harmonics and the disturbance spectrum of the converter/power converter can advantageously be compensated and reduced as a result. Such a power converter can therefore be modeled in a simulation comparatively easily as a compact component (without considerable harmonics arising).

REFERENCE SIGNS 1, 600 Power converter
1_1 . . . 1_n Module

1_x, 1_y Controllable voltage source
5, 7, 9 AC voltage connection
11, 13, 18,
21, 27, 29 Phase module branch
15, 24, 31,
603 Phase module
16, 17 DC voltage connection
200, 300 Module
202, 206,
302, 306 Electronic switching element
204, 208,
304, 308 Diode
210 Energy store
212, 215,
315 Electrical module connection
405 Voltage sensor
410 Actuation circuit
1a Control device of the power converter
1b Actuation of the controllable voltage source
1c Regulation device
1d Control law of the regulating device
1e Noise shaping and control error correction
2a Series-connected modules (phase module)
2a' Phase module model/model of the series-connected modules
2b Controllable voltage source/highly dynamic voltage source
2b' Model of the controllable voltage source
3a Dynamics of the derivation
3a' Model of the derivation
3b Dynamics of the measurement system
3b' Model of the measurement system
4' Disturbance model for the error voltage (disturbance model for sinusoidal oscillations)
503 Phase module with controller
506 Non-linear dynamics/non-linear switching behavior affected by dead times
506' Model of the non-linear dynamics/non-linear switching behavior affected by dead times
509 Linear dynamics
509' Model of the linear dynamics
511 Non-linear characteristics/non-linear switching behavior
511' Model of the non-linear characteristics/non-linear switching behavior
513 Linear dynamics
513' Model of the linear dynamics
515 Additional controllable voltage source unit
518 Controlled system with measurement element/measurement system
520 Noise shaping filter
D Feedback matrices
e(t) Model error
g1(t) (First) total phase module voltage
g2(t) (Second) total phase module voltage
k(t) Compensation voltage, output voltage of the controllable voltage source
$k_{r1}$, $k_{r2}$ Weighting vectors
m(t) Measurement voltage
m^(t) Estimated value for the measurement voltage/model variable
o(t) Harmonics of the energy network
r(t) Quantization noise
s(t) Control signal
u(t) Output voltage of the phase module
u^(t) Expected value/estimated value of the output voltage u(t)
$u_e$(t) Real active control signal
$u_e$^(t) Estimated active control signal
$u_f$(t) Voltage error, actuation signal for controllable voltage source
$u_s$(t) Power converter setpoint voltage
$x_1$^(t) State variables of the system model (which comprises the model of the linear dynamics 509', the model of the linear dynamics 513' and the model of the derivation 3a')
$x_2$^(t) State variables of the disturbance model 4'

The invention claimed is:

1. A power converter, comprising:
at least one phase module having a plurality of modules, being electrically connected in series, each of said plurality of modules having a first electrical module connection, a second electrical module connection, a first electronic switching element, a second electronic switching element and an electrical energy store, said at least one phase module further having at least one controllable voltage source for generating a compensation voltage in response to a corresponding actuation, the compensation voltage having a time profile such that the compensation voltage reduces an error voltage generated by a switching of said first electronic switching element and said second electronic switching element of said plurality of modules, wherein the compensation voltage reduces a high-frequency disturbance power generated by the power converter.

2. The power converter according to claim 1, wherein said at least one controllable voltage source has a transmission behavior with a broader bandwidth than said plurality of modules.

3. The power converter according to claim 1, wherein said at least one phase module has an AC voltage connection, a first DC voltage connection and a second DC voltage connection.

4. The power converter according to claim 3, wherein:
said at least one controllable voltage source is disposed at one of said first and second DC voltage terminals of said at least one phase module;
and/or said at least one controllable voltage source is disposed at said AC voltage connection of said at least one phase module.

5. The power converter according to claim 3, wherein:
said at least one phase module is one of three phase modules, which have a common electrical connecting point at said first and second DC voltage connections; and
said at least one controllable voltage source of said phase modules is disposed in each case at an end of said phase module allocated to said second DC connecting point.

6. The power converter according to claim 1, wherein said at least one controllable voltage source is connected in series with said plurality of modules of said at least one phase module.

7. The power converter according to claim 1, further comprising an AC voltage feed line, said at least one controllable voltage source is disposed in said AC voltage feed line.

8. The power converter according to claim 1, further comprising a first connection for an AC voltage and a second connection for an AC voltage or a DC voltage.

9. The power converter according to claim 1, wherein said at least one controllable voltage source has a lower rated voltage than said plurality of modules.

10. A method for reducing an error voltage in a power converter, the power converter having at least one phase module with a plurality of modules being electrically connected in series and wherein each of the plurality of modules has a first electrical module connection, a second electrical module connection, a first electronic switching element, a second electronic switching element and an electrical energy store, wherein the at least one phase module is assigned at least one controllable voltage source, the method which comprises the steps of:

actuating the at least one controllable voltage source such that it generates a compensation voltage having a time profile such that an error voltage generated by a switching of first electronic switching elements and the second electronic switching elements of the plurality of modules is reduced thereby, wherein the compensation voltage reduces a high-frequency disturbance power generated by the power converter.

11. The method according to claim 10, which further comprises coupling the compensation voltage into the at least one phase module.

12. The method according to claim 10, which further comprises:

using a model, which has at least one phase module model for a phase module, a voltage source model for the at least one controllable voltage source and a disturbance model for the error voltage, to actuate the at least one controllable voltage source;
   ascertaining a model error as a difference between a measurement variable measured at the power converter and an associated model variable determined by means of the model; and
   feeding back the model error to the model in weighted form by means of at least one feedback matrix.

13. The method according to claim 12, which further comprises:

using an observer to actuate the at least one controllable voltage source, and in response to changes in spectral properties of the measurement variable after a spectral analysis thereof, dynamics of the observer are dynamically adjusted to change the spectral properties.

14. The method according to claim 12, which further comprises using a model of at least a first order and/or a model of a second order for estimating sinusoidal oscillations as a disturbance model.

15. The method according to claim 12, wherein the at least one phase module model and/or the at least one voltage source model each have a linear model portion and a non-linear model portion.

16. The method according to claim 15, which further comprises modeling a non-linear switching behavior of the first electronic switching element and of the second electronic switching element of the plurality of modules by means of the non-linear model portion of the at least one phase module model.

17. The method according to claim 15, which further comprises modeling dead times of non-linear switching behavior of the first electronic switching element and of the second electronic switching element of the plurality of modules by means of the non-linear model portion of the at least one phase module model.

18. The method according to claim 15, which further comprises using a time-discrete filter as the linear model portion and/or the non-linear model portion and is simulated by means of a predictive Euler method.

19. The method according to claim 15, which further comprises carrying out a value calculation by means of the non-linear model portion at a higher frequency and a lower integration increment than a value calculation by means of the linear model portion.

20. The method according to claim 12, which further comprises:

ascertaining estimated values for an actuation of the first electronic switching element and of the second electronic switching element of the plurality of modules by means of the model; and
   outputting the estimated values.

21. The method according to claim 10, which further comprises adjusting an integration increment for a time-discrete value calculation to a period of an AC voltage applied to the power converter.

* * * * *